Oct. 30, 1956     A. J. KRAMER     2,768,838
PARALLEL TOW HITCH
Filed Aug. 2, 1955
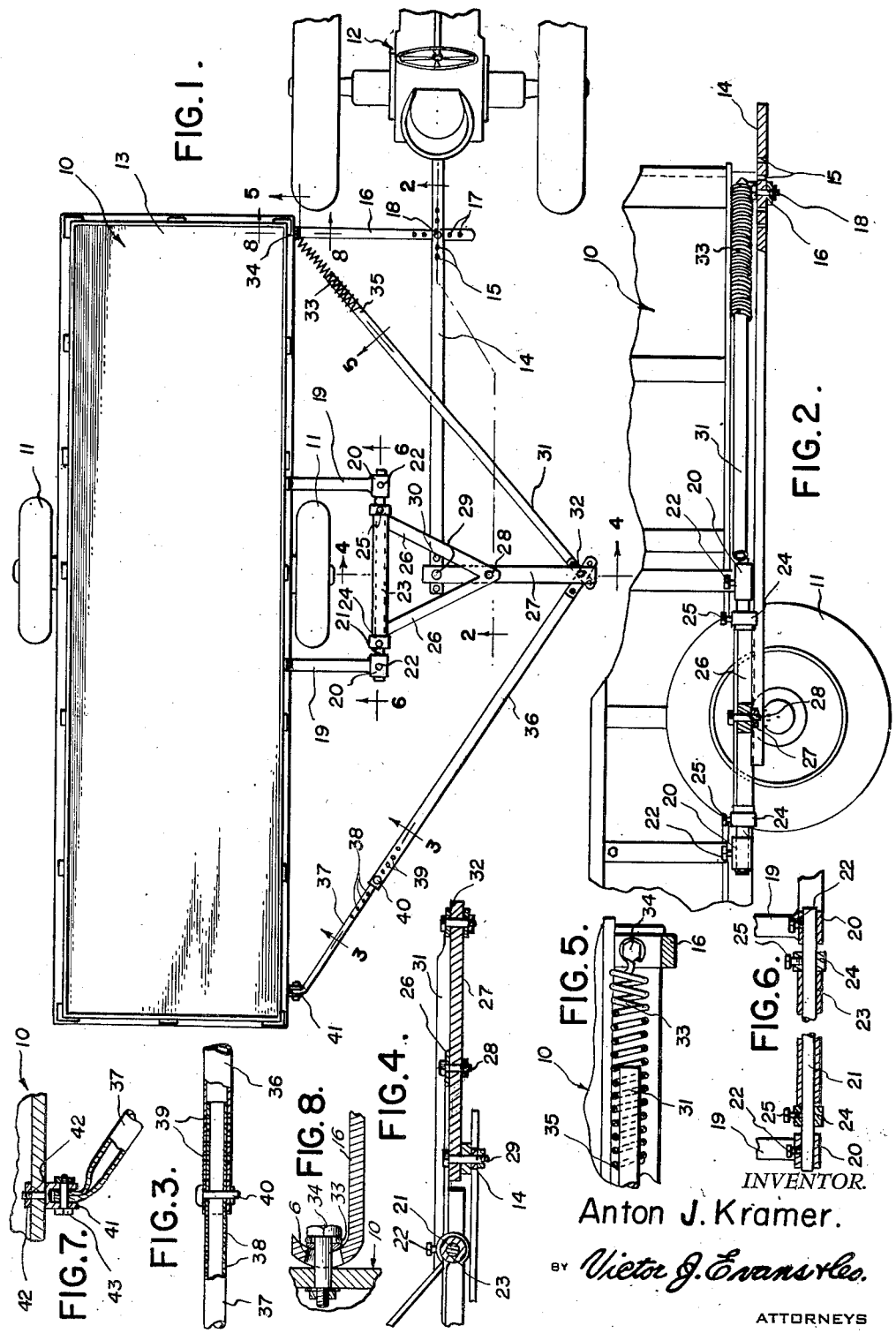
INVENTOR.
Anton J. Kramer.
BY *Victor J. Evans & Co.*
ATTORNEYS

United States Patent Office

2,768,838
PARALLEL TOW HITCH

Anton J. Kramer, Fellsmere, Fla.

Application August 2, 1955, Serial No. 525,889

3 Claims. (Cl. 280—472)

This invention relates to a hitch, and more particularly to a hitch for connecting a tractor to an agricultural implement such as a cane harvester.

The object of the invention is to provide a hitch which will permit a tractor to tow agricultural equipment such as a cane harvester, with the harvester or other implement arranged laterally offset from the rear of the tractor so that the longitudinal axis of the harvester is parallel to the longitudinal axis of the tractor.

Another object of the invention is to provide a parallel tow hitch which will maintain the implement being towed in its proper aligned position to one side of and rearwardly of the tractor, and wherein the hitch includes flexible joints so that the implement can ride over uneven terrain without damaging the hitch.

A further object of the invention is to provide a parallel tow hitch which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a plan view showing the hitch for connecting an implement to a tractor.

Figure 2 is a sectional view taken on the line 2—2 of Figure 1.

Figure 3 is a sectional view taken on the line 3—3 of Figure 1.

Figure 4 is a sectional view taken on the line 4—4 of Figure 1.

Figure 5 is a sectional view taken on the line 5—5 of Figure 1.

Figure 6 is a sectional view taken on the line 6—6 of Figure 1.

Figure 7 is a fragmentary elevational view, with parts broken away and in section, showing certain constructional details of the apparatus.

Figure 8 is a sectional view taken on the line 8—8 of Figure 1.

Referring in detail to the drawings, the numeral 10 designates an implement being towed, and the implement 10 may include a horizontally disposed platform 13 which is mounted on wheels 11, Figure 1. The numeral 12 designates a portion of a conventional tractor, and the present invention is directed to a hitch whereby the implement 10 is towed behind the tractor 12 with the implement 10 laterally offset from the rear of the tractor. Thus, the longitudinal axis of the implement 10 is parallel to the longitudinal axis of the tractor 12.

The hitch of the present invention includes a drawbar 14 which extends rearwardly from the tractor 12 and is connected thereto in the usual manner, and the drawbar 14 is provided with a plurality of apertures 15 for a purpose to be later described. Arranged at right angles with respect to the drawbar 14 and extending from one side of the implement 10 adjacent the front end thereof is a horizontally disposed brace 16. The brace 16 is provided with a plurality of apertures 17, and one of the apertures 17 is adapted to register with one of the apertures 15. A suitable securing element such as a bolt and nut assembly 18 extends through these registering apertures for connecting the brace 16 and drawbar 14 together.

Extending outwardly from one side of the implement 10 and secured thereto is a pair of spaced parallel ears 19 which each have an enlarged portion 20 on their outer end. A horizontally disposed shaft 21 extends between the enlarged portions 20 of the ears 19, and set screws 22 serve to secure the shaft 21 in the enlarged portions 20, Figure 6.

Rotatably mounted on the shaft 21 is a tube 23, and collars 24 are also mounted on the shaft 21 adjacent each end of the tube 23. Set screws 25 extend through the collars 24 and engage the shaft 21. Extending outwardly from the tube 23 and secured thereto, is a pair of angularly arranged fingers 26, Figure 1. A link 27 is pivotally connected to the fingers 26 at their junction by means of a pivot pin or bolt and nut assembly 28. A bolt 29 connects the inner end of the link 27 to the rear end of the drawbar 14, and the bolt 29 may extend through one of a plurality of openings 30 in the drawbar 14.

The hitch of the present invention further includes a first arm 31 which is connected to the outer end of the link 27 by means of a bolt and nut assembly 32, and a coil spring 33 connects the inner end of the arm 31 to the implement 10. The coil spring 33 may have one end connected to the implement 10 by means of a bolt 34, Figure 5, while the other end of the coil spring 33 may be secured to the arm 31 by means of welding which is indicated by the numeral 35. The bolt 34 extends through a cutout or slot 6 in a portion of the brace 16, Figure 8, so that pivotal movement between the various parts can take place. A second arm 36 is arranged angularly with respect to the arm 31, and the arm 36 may be hollow for telescopically or slidably receiving therein a hollow rod 37. The rod 37 is provided with apertures 38 which are adapted to register with apertures 39 in the arm 36 whereby a suitable securing element 40 can be extended through these apertures 38 and 39 for maintaining the rod 37 immobile in its adjusted positions in the arm 36. A bracket 41 may be secured to the member 10 by a suitable securing element 42, and the member 37 is pivotally mounted in the bracket 41 by means of a pivot pin or bolt and nut assembly 43. The member 10 is adapted to be towed by the tractor 12.

From the foregoing it is apparent that there has been provided a hitch which will enable implements such as the implement 10 to be towed behind a tractor such as the tractor 12 while the implement 10 is laterally offset from the rear of the tractor as shown in Figure 1. In use as the tractor 12 moves forwardly the drawbar 14 will pull the implement 10 forwardly since the drawbar 14 is connected to the link 27 and to the brace 16. The rotatable mounting of the tube 23 on the shaft 21 and the springs which connect the arms to the side of the implement 10 permit pivotal movement of the implement 10 independent of the tractor 12 so that the implement can ride over uneven or irregular ground surfaces without causing damage to the parts. The hitch can be adjusted to permit implements of various sizes to be connected thereto and for example the rod 37 can be telescoped into or out of the arm 36 and held in its adjusted position by means of the bolt 40. Similarly the bolt 18 can be extended through any of the apertures 15 or 17. The hitch construction also insures that the implement 10 will be moved in a reverse direction when the tractor 12 is backed up or reversed. With the present invention parallel towing of an implement such as a cane harvester can be effected in the event that it is necessary to have the tractor 12 arranged at one side of the implement. Also, the implement will be held steady and side sway will be prevented and grease fittings can be used wherever desired.

I claim:

1. In combination, a tractor, a drawbar extending rearwardly from said tractor and provided with a plurality of spaced apertures intermediate its ends, a mobile implement laterally offset with respect to the rear of said tractor and having its longitudinal axis parallel to the longitudinal axis of said tractor, a brace extending from one side of said implement and secured thereto, there being a plurality of apertures in the outer end of said brace, a securing element extending through one of the apertures in said brace and through one of the apertures in said drawbar, a pair of spaced parallel ears extending outwardly from the side of said implement, a shaft extending between the outer ends of said ears and supported thereby, a tube rotatably mounted on said shaft, a pair of angularly arranged fingers extending outwardly from said tube and secured thereto, a link pivotally connected to said fingers at the junction thereof, a first arm connected to the outer end of said link, a coil spring connecting said arm to said implement, a second arm arranged angularly with respect to said first arm and connected to said link, said second arm being hollow, and a hollow rod slidably mounted in said second arm.

2. The structure as defined in claim 1, wherein said second arm and rod are provided with a plurality of registering openings, and a securing element extending through certain of said registering openings.

3. In combination, a tractor, a mobile implement laterally offset with respect to the rear of said tractor and having its longitudinal axis parallel to the longitudinal axis of said tractor, a drawbar extending rearwardly from said tractor, and means connecting said implement to said drawbar, said means comprising a pair of angularly arranged arms extending from said implement, a link having one end connected to said arms at the intersections of said arms with each other, and the other end of said link being connected to the rear of said drawbar, and a brace extending between said implement and drawbar and connected thereto, said brace being arranged adjacent the front portion of the mobile implement, and said brace being connected to the front portion of the drawbar.

References Cited in the file of this patent
UNITED STATES PATENTS

| | | |
|---|---|---|
| 2,512,097 | Goodspeed | June 20, 1950 |
| 2,596,902 | Krause | May 13, 1952 |
| 2,707,643 | Nelson | May 3, 1955 |